(12) United States Patent
Lee et al.

(10) Patent No.: US 10,725,667 B2
(45) Date of Patent: Jul. 28, 2020

(54) METHOD OF TRANSFERRING DATA IN PARALLEL SYSTEM, AND PARALLEL SYSTEM FOR PERFORMING THE SAME

(71) Applicant: SEOUL NATIONAL UNIVERSITY R&DB FOUNDATION, Seoul (KR)

(72) Inventors: Jaejin Lee, Seoul (KR); Gangwon Jo, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 70 days.

(21) Appl. No.: 15/874,322

(22) Filed: Jan. 18, 2018

(65) Prior Publication Data

US 2018/0203617 A1    Jul. 19, 2018

(30) Foreign Application Priority Data

Jan. 19, 2017  (KR) .................. 10-2017-0009438
Jan. 8, 2018    (KR) .................. 10-2018-0002229

(51) Int. Cl.
| | |
|---|---|
| *G06F 3/06* | (2006.01) |
| *G06F 15/163* | (2006.01) |
| *G06F 15/167* | (2006.01) |
| *G06F 12/08* | (2016.01) |
| *G06F 12/14* | (2006.01) |

(52) U.S. Cl.
CPC .......... *G06F 3/0617* (2013.01); *G06F 3/0634* (2013.01); *G06F 3/0659* (2013.01); *G06F 3/0683* (2013.01); *G06F 15/163* (2013.01); *G06F 15/167* (2013.01); *G06F 12/08* (2013.01); *G06F 12/1441* (2013.01); *G06F 2212/1024* (2013.01)

(58) Field of Classification Search
CPC combination set(s) only.
See application file for complete search history.

(56) References Cited

U.S. PATENT DOCUMENTS

2009/0205053 A1*  8/2009  Sriram ................ G06F 12/1408
                                                                726/30
2013/0232495 A1*  9/2013  Rossbach ............. G06F 9/5038
                                                                718/102

FOREIGN PATENT DOCUMENTS

KR    10-2011-0037492 A     4/2011
KR    10-2013-0127480 A     11/2013

* cited by examiner

*Primary Examiner* — Yong J Choe
(74) *Attorney, Agent, or Firm* — KORUS Patent, LLC; Seong Il Jeong

(57) ABSTRACT

Disclosed herein are a method of transferring data in a parallel system including a main device and at least one accelerator, and a parallel system for performing the method. The method of transferring data in a heterogeneous system including a main device and at least one accelerator includes: turning off a write permission for a first main memory area corresponding to a first accelerator memory area where input data for a computation task is stored; performing the computation task by using the at least one accelerator; and turning off a read permission for a second main memory area corresponding to a second accelerator memory area where output data for the computation task is stored, in the state in which data of the second accelerator memory area has not been transferred to the second main memory area.

16 Claims, 6 Drawing Sheets

| NO. | START ADDRESS OF ACCELERATOR MEMORY AREA | START ADDRESS OF MAIN MEMORY AREA | LENGTH OF AREA (bytes) | MODIFIED VALUE |
|---|---|---|---|---|
| 1 | 0x00001000 | 0x7f003000 | 100 | FALSE |
| 2 | 0x00001200 | 0x7f018500 | 450 | FALSE |
| 3 | 0x00002000 | 0x7f009000 | 700 | TRUE |

FIG. 2

METHOD OF TRANSFERRING DATA IN PARALLEL SYSTEM, AND PARALLEL SYSTEM FOR PERFORMING THE SAME

BACKGROUND

1. Technical Field

Embodiments disclosed in the present specification relate to a method of transferring data in a parallel system and a parallel system for performing the method, and more specifically to a method of transferring data in a parallel system and a parallel system for performing the method, which are capable of minimizing data transfer between main memory and accelerator memory, thereby improving performance.

2. Description of the Related Art

A heterogeneous system is a system including a main processor, such as a general-purpose central processing unit (CPU) or the like, and an accelerator, and is a type of parallel system. Computation can be performed in parallel by executing a parallel program in a heterogeneous system, and is thus widely used for various fields requiring large amounts of computation, such as high performance computing (HPC), big data analytics, deep learning, etc.

When parallel computation is performed in a heterogeneous system, data transfer occurs between main memory and accelerator memory. The efficiency of parallel computation can be improved by minimizing data transfer tasks through the elimination of unnecessary data transfer.

Meanwhile, the above-described related art corresponds to technical information which has been possessed by the present inventor in order to contrive the present invention or which has been acquired in the process of contriving the present invention, and cannot be necessarily viewed as a well-known technology which had been known to the public before the filing of the present invention.

SUMMARY

An object of embodiments disclosed in the present specification is to provide a method of transferring data in a parallel system and a parallel system for performing the method.

As a technical solution for accomplishing the above-described object, according to an embodiment of the present invention, there is provided a method of transferring data in a heterogeneous system including a main device and at least one accelerator, the method including: turning off a write permission for a first main memory area corresponding to a first accelerator memory area where input data for a computation task is stored; performing the computation task by using the at least one accelerator; and turning off a read permission for a second main memory area corresponding to a second accelerator memory area where output data for the computation task is stored, in the state in which data of the second accelerator memory area has not been transferred to the second main memory area.

According to another embodiment of the present invention, there is provided a computer program for performing a method of transferring data in a heterogeneous system, the method including: turning off a write permission for a first main memory area corresponding to a first accelerator memory area where input data for a computation task is stored; performing the computation task by using the at least one accelerator; and turning off a read permission for a second main memory area corresponding to a second accelerator memory area where output data for the computation task is stored, in the state in which data of the second accelerator memory area has not been transferred to the second main memory area.

According to still another embodiment of the present invention, there is provided a computer-readable storage medium having stored thereon a computer program for performing a method of transferring data in a heterogeneous system, the method including: turning off a write permission for a first main memory area corresponding to a first accelerator memory area where input data for a computation task is stored; performing the computation task by using the at least one accelerator; and turning off a read permission for a second main memory area corresponding to a second accelerator memory area where output data for the computation task is stored, in the state in which data of the second accelerator memory area has not been transferred to the second main memory area.

According to yet another embodiment of the present invention, there is provided a heterogeneous system including: a main device including a main processor and main memory; and at least one accelerator including an accelerator processor and accelerator memory; wherein the main processor turns off a write permission for a first main memory area corresponding to a first accelerator memory area where input data for a computation task is stored, performs control so that the at least one accelerator performs the computation task, and turns off a read permission for a second main memory area corresponding to a second accelerator memory area where output data for the computation task is stored, in a state in which data of the second accelerator memory area has not been transferred to the second main memory area.

BRIEF DESCRIPTION OF THE DRAWINGS

The above and other objects, features and advantages of the present invention will be more clearly understood from the following detailed description taken in conjunction with the accompanying drawings, in which:

FIG. 2 is a list of data which is used in a method of transferring data in a parallel system according to an embodiment of the present invention;

DETAILED DESCRIPTION

Figure 1:
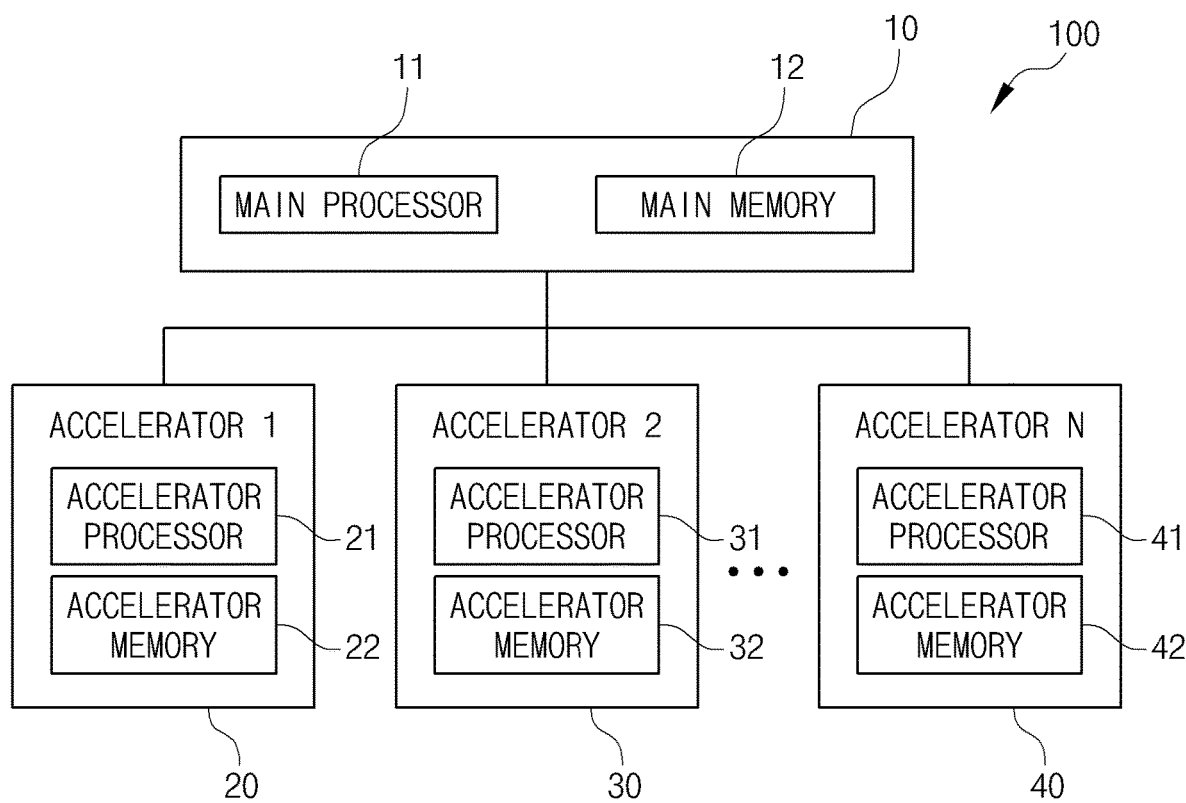
FIG. 1 is a view showing a parallel system according an embodiment of the present invention.

Various embodiments of the present invention will be described in detail below with reference to the accompanying drawings. The present invention may be modified and practiced in various different forms, and is not limited to the embodiments described herein. In order to more clearly describe the features of the embodiments, detailed descriptions of items well known to those having ordinary knowledge in the art to which the embodiments pertain will be omitted.

Furthermore, in the drawings, parts unrelated to descriptions of the embodiments will be omitted, and similar reference symbols will be assigned to similar parts throughout the specification.

Throughout the specification, when a part is described as being "connected" to another part, this includes not only a case where they are "directly connected" to each other but also a case where they are "electrically connected" to each other with another element interposed therebetween. Furthermore, when a part is described as "including" a component, this means that another component is not be excluded from the part but may be included in the part, unless particularly described to the contrary.

The following embodiments are directed to a method of transferring data in a parallel system and a parallel system for performing the method. The term "parallel system" refers to a system for processing computation in parallel using two or more compute devices which can communicate with each other. In particular, in the present specification, the following description will be given on the assumption that the parallel system is a heterogeneous system as an example.

The term "heterogeneous system" refers to a system including a main processor, such as a general-purpose CPU or the like, and an accelerator. The term "accelerator" refers to a processor which is specialized for computation of a specific pattern, unlike a general-purpose CPU. A representative example of the accelerator is a Graphics Processing Unit (GPU). Additionally, an Intel Xeon Phi coprocessor, a FPGA, etc. are widely used as the accelerator.

FIG. 1 is a view showing a heterogeneous system 100 according an embodiment of the present invention. Referring to FIG. 1, the heterogeneous system 100 may include a main device 10 and a plurality of accelerators 20, 30, and 40. The main device 10 may include a main processor 11 and main memory 12, and each of the accelerators 20, 30, and 40 may include an accelerator processor 21, 31, or 41 and accelerator memory 22, 32, or 42. Although the heterogeneous system 100 is shown as including the plurality of accelerators 20, 30, and 40 in FIG. 1, the heterogeneous system 100 may include a main device 10 and only a single accelerator.

When a parallel program is executed in the heterogeneous system 100, part of a computation task is performed in the accelerators 20, 30, and 40, and the remaining part of the computation task and input/output tasks are performed in the main device 10.

When the main processor 11 performs a computation task, the main processor 11 reads data from the main memory 12 or writes data to the main memory 12. In contrast, when the accelerator processors 21, 31, and 41 perform a computation task, the accelerator processors 21, 31, and 41 read data from the accelerator memory 22, 32, and 42 or write data to the accelerator memory 22, 32, and 42.

Accordingly, in order for the accelerator processors 21, 31, and 41 to read data written to the main memory 12 by the main processor 11, the accelerator processors 21, 31, and 41 need to transfer the data from the main memory 12 to the accelerator memory 22, 32, or 42. In the same manner, in order for the main processor 11 to read data written to the accelerator memory 22, 32, or 42 by the accelerator processors 21, 31, and 41, the main processor 11 needs to transfer the data from the accelerator memory 22, 32, and 42 to the main memory 12.

Accordingly, when a program to be executed in the heterogeneous system 100 is created, settings need to be made such that parts of an overall computation task are designated as being executed in the accelerators 20, 30, and 40 and transfer tasks are performed between the main memory 12 and the accelerator memory 22, 32, and 42 with the performance of a data computation task.

Meanwhile, due to a mistake of a programmer, for the sake of the ease of development, due to the functional limitation of a parallel programming model, or for another reason, a data transfer task may be unnecessarily performed. As an example, in spite of the fact that there is no need for the main processor 11 to read data written to the accelerator memory 22, 32, and 42 by the accelerator processors 21, 31, and 41, there may occur a situation in which the corresponding data is transferred from the accelerator memory 22, 32, and 42 to the main memory 12.

As another example, there may occur a situation in which data stored (or having been stored) in the accelerator memory 22, 32, and 42 is transferred from the main memory 12 back to the accelerator memory 22, 32, and 42, or a situation in which data stored (or having been stored) in the main memory 12 is transferred from the accelerator memory 22, 32, and 42 back to the main memory 12.

In particular, although relatively low-level parallel programming models, such as OpenCL, CUDA, etc., have been chiefly used to create programs which are executed in the heterogeneous system so far, compiler directive-based relatively low-level parallel programming models, such as OpenMP 4.0, OpenACC, etc., started to be used in order to facilitate programming recently. When one of the latter parallel programming models is used, a program which is executed only in the main device 10 may be easily modified to be used in conjunction with the accelerators 20, 30, and 40, but there increases possibility that unnecessary data transfer occurs.

In the heterogeneous system 100 according to an embodiment, in order to eliminate unnecessary data transfer, even when a program requests a data transfer task, the data transfer task is not performed. In other words, it is not until the accelerator processors 21, 31, and 41 actually read data written to the main memory 12 by the main processor 11 or until the main processor 11 actually reads data written to one of the accelerator memory 22, 32, and 42 by the accelerator processor 21, 31, or 41 that a data transfer task is performed between the main memory 12 and the accelerator memory 22, 32, and 42.

It is assumed that data to be read and data to be written during the performance of a specific computation task in the accelerators 20, 30, and 40 are known in advance. For example, such data may be designated directly by a programmer, or may be determined through analysis using a separate compiler technology. For example, in the cases of OpenMP 4.0 and OpenACC, a programmer directly designates such data. Data to be read and data to be written during the performance of a computation task or an input/output task in the main device 10 may be determined using the page fault handler of an operating system (OS).

According to an embodiment, it is assumed that one or more computation tasks within a program are performed in the accelerators 20, 30, and 40, and it is also assumed that input data, i.e., the area of the main memory 12 from which the accelerators 20, 30, and 40 will read data in order to perform each of the computation tasks, and output data, i.e., the area of the main memory 12 in which data written to the accelerator memory 22, 32, and 42 as a result of the performance of each of the computation tasks in the accelerators 20, 30, and 40 will be stored, are given for each of the computation tasks which are performed in the accelerators 20, 30, and 40.

In the following, a specific area of the main memory 12 where the input data of a computation task is stored is referred to as an "input data area," whereas a specific area of the main memory 12 where the output data of the computation task is stored is referred to as an "output data area." An input data area and an output data area for a specific computation task may be specified by a programmer, may be automatically identified by a separate technology, for example, source code analysis, or may be obtained using these two methods.

Furthermore, for the given input data area, the computation task which is performed in the accelerators 20, 30, and 40 may read all elements included in the area without omission, or may read only some of all the elements. In the same manner, for the given output data area, the computation task which is performed in the accelerators 20, 30, and 40 may write all elements included in the area, or may write only some of all the elements.

A "memory object" may be allocated to the accelerator memory 22, 32, and 42. In this case, the term "memory object" refers to an area of the same size which is allocated to the accelerator memory 22, 32, and 42 in accordance with a specific area of the main memory 12. Accordingly, each memory object corresponds to a specific area of the main memory 12.

Furthermore, each memory object has a "modified value" which is expressed as true or false. In this case, a "modified value" is a value indicative of whether the statement "the main processor 11 has written values (a value) to all or part of the specific area of the main memory 12 after data in the specific area of the main memory 12 was finally transferred to the memory object corresponding to the specific area of the main memory 12" is true or false.

For example, when the main processor 11 has written values (a value) to all or part of the specific area of the main memory 12 after data in the specific area of the main memory 12 was transferred to the memory object, the modified value of the memory object becomes "true." In other words, the fact that the modified value of the memory object is "true" means that the identify between the data stored in the memory object and the data stored in the specific area of the main memory 12 corresponding to the memory object cannot be ensured.

In contrast, the fact that the modified value of the memory object is "false" means that the main processor 11 has not written values (a value) to all or part of the specific area of the main memory 12 after the data in the specific area of the main memory 12 was transferred to the memory object, and thus the data stored in the memory object and the data stored in the specific area of the main memory 12 corresponding to the memory object are identical.

If a memory object whose modified value is "true" is given as input data, data needs to be transferred from the specific area of the main memory 12 to the memory object. In contrast, if a memory object whose modified value is "false" is given as input data, the accelerator processor 21, 31, 41 may use data stored in the memory object without change.

According to an embodiment of the present invention, in order to store information about memory objects currently allocated to the accelerator memory 22, 32, and 42, there may be used a list including the areas of the accelerator memory 22, 32, and 42 to which the memory objects have been allocated (start addresses, and lengths), main memory areas corresponding to the above areas (start addresses, and lengths), and the modified values of the memory objects. FIG. 2 shows an example of such a list. Such a list may be stored in the main memory 12, the accelerator memory 22, 32, and 42, or another type of storage. When a program is started, any memory object has not been allocated to the accelerator memory 22, 32, and 42. Accordingly, when a new memory object is allocated to the accelerator memory 22, 32, and 42, this means that the new data is transferred to a specific area of the accelerator memory 22, 32, and 42 first, and thus the modified value of the corresponding memory object becomes "false."

A method of performing data transfer between the main memory 12 and the accelerator memory 22, 32, and 42 after or before the performance of a computation task in the accelerators 20, 30, and 40 and a method of performing data transfer between the main memory 12 and the accelerator memory 22, 32, and 42 when the main processor 11 attempts to access the main memory 12 are described in detail below.

Figure 3:
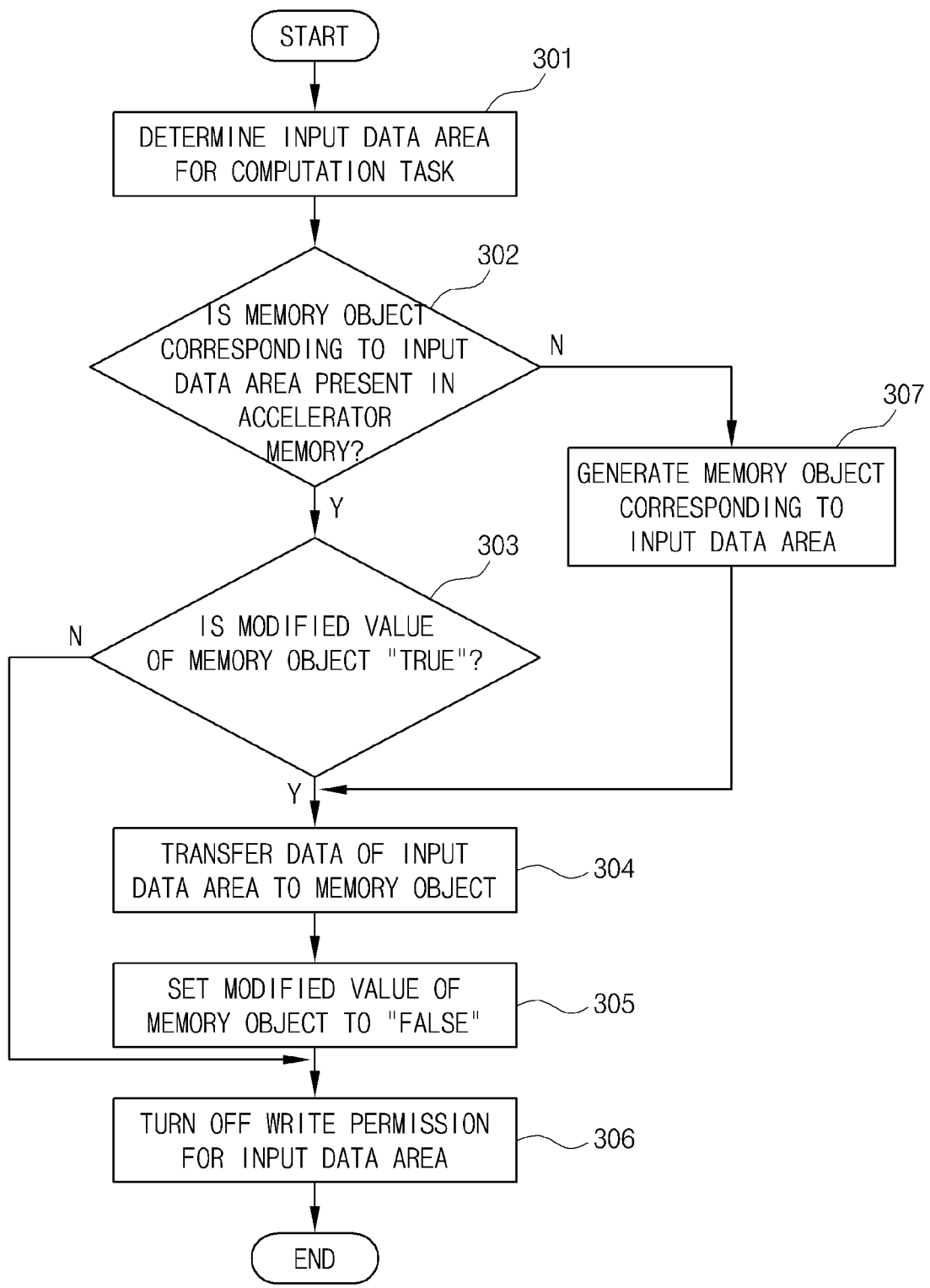
FIGS. 3 and 4 are flowcharts illustrating a method of transferring data before or after the performance of a computation task in an accelerator in a parallel system according to an embodiment of the present invention.
Figure 4:
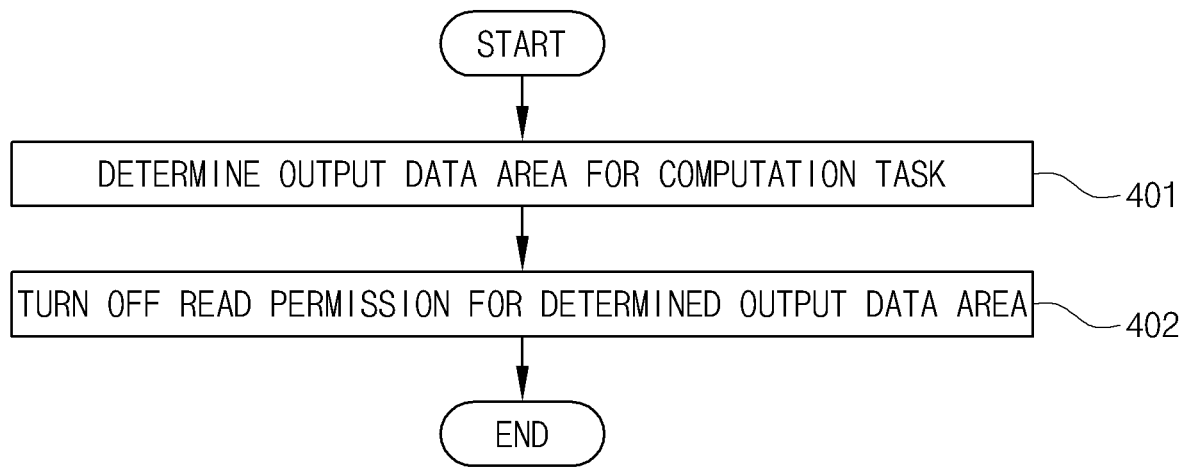

First, referring to FIGS. 3 and 4, the method of performing data transfer between the main memory 12 and the accelerator memory 22, 32, and 42 after or before the performance of a computation task in the accelerators 20, 30, and 40 is described first.

Before the performance of a computation task in the accelerators 20, 30, and 40, the main processor 11 conforms the data of an input data area for the computation task to the data of a corresponding memory object, and turns off a write permission for the input data area. The flowchart of FIG. 3 includes processes which are performed immediately before the performance of a specific computation task in the accelerators 20, 30, and 40. For ease of description, the following description is given on the assumption that the processes included in FIG. 3 are performed before the performance of a computation task in accelerator 1 20.

Referring to FIG. 3, at step 301, the main processor 11 determines an input data area for a computation task. In detail, the main processor 11 determines an area of the main memory 12 where data, which will be used as input for the computation task to be performed in accelerator 1 20, has been stored.

At step 302, the main processor 11 determines whether a memory object corresponding to the input data area determined at step 301 is present in the accelerator memory 22. The main processor 11 may determine whether a memory object corresponding to the input data area is present in the accelerator memory 22 by determining whether a main memory area corresponding to the input data area determined at step 301 is present in the list shown in FIG. 2 while inspecting all the elements of the list.

If, as a result of the determination, a memory object corresponding to the input data area is present in the accelerator memory 22, the process proceeds to step 303, at which the main processor 11 determines whether the modified value of the memory object is "true."

If the modified value is "true," the identity between the data of the input data area and the data of the memory object cannot be ensured, and thus the main processor 11 transfers the data of the input data area to the memory object at step 304. Thereafter, at step 305, the main processor 11 sets the modified value of the memory object to "false."

At step 306, the main processor 11 turns off a write permission for the input data area. In this case, turning off a write permission for the input data area may means, for example, turning off write permissions for all pages included in or present throughout the input data area.

In greater detail, at step 306, the main processor 11 turns off write permissions for all the pages included in or present throughout the input data area by using system calls of an OS. Then, when the main processor 11 writes a value to the input data area, a page fault interrupt occurs.

If, as a result of the determination at step 303, the modified value of the memory object is "false," this means that the identity between the data of the input data area and the data of the memory object is ensured, and thus the process directly proceeds to step 306, at which the main processor 11 turns off a write permission for the input data area.

Meanwhile, if, as a result of the determination at step 302, a memory object corresponding to the input data area is not present in the accelerator memory 22, the process proceeds to step 307, at which the main processor 11 generates a new memory object in the accelerator memory 22. Thereafter, the main processor 11 transfers the data, stored in the input data area, to the memory object at step 304, and sets the modified value of the memory object to "false" at step 305. At step 306, the main processor 11 turns off a write permission for the input data area.

The main processor 11 performs the above-described task on all input data areas for the computation task.

After the computation task has been performed in the accelerators 20, 30, and 40, the main processor 11 turns off a read permission for an output data area without transferring the data of a memory object corresponding to the output data area to the output data area. Furthermore, the main processor 11 does not release the allocation of the memory object even after the computation task has been performed. The flowchart of FIG. 4 includes processes which are performed immediately after a specific computation task has been performed in the accelerators 20, 30, and 40. For ease of description, the following description is given on the assumption that the processes included in FIG. 4 are performed after the computation task has been performed in the accelerator 1 20.

Referring to FIG. 4, immediately after the specific computation task has been performed in the accelerator 1 20, the main processor 11 determine an output data area for the computation task at step 401.

At step 402, the main processor 11 turns off a read permission for the output data area. In this case, turning off a read permission may mean turning off a read permission for the output data area, for example, read permissions for all pages included in or present throughout the output data area.

In greater detail, at step 402, the main processor 11 turns off read permissions for all pages included in or present throughout the output data area by using the system calls of an OS. Then, when the main processor 11 reads a value from the output data area, a page fault interrupt occurs.

Meanwhile, the main processor 11 does not transfer the data of a memory object, present in the accelerator memory 22, to the output data area in spite of the content of an original program. Furthermore, the main processor 11 does not release the allocation of the memory object in spite of the content of an original program.

The main processor 11 performs the above-described task on all output data areas for the computation task.

A method of performing data transfer when the main processor 11 accesses the main memory 12 to perform a read or write operation but the operation is denied due to the absence of a permission is described in detail below with reference to FIGS. 5 and 6.

According to an embodiment of the present invention, the main processor 11 may set the "data access detection function" of the present invention to a page fault handler by means of a system call of an OS at a specific time after the start of a program and before the performance of a specific computation task in the accelerators 20, 30, and 40. In the state in which a write or read permission for a specific area of the main memory 12 has been turned off, when the main processor 11 writes a value to or reads a value from pages included in or present throughout the corresponding area, a page fault interrupt is generated, and then a data access detection function is invoked.

Figure 5:
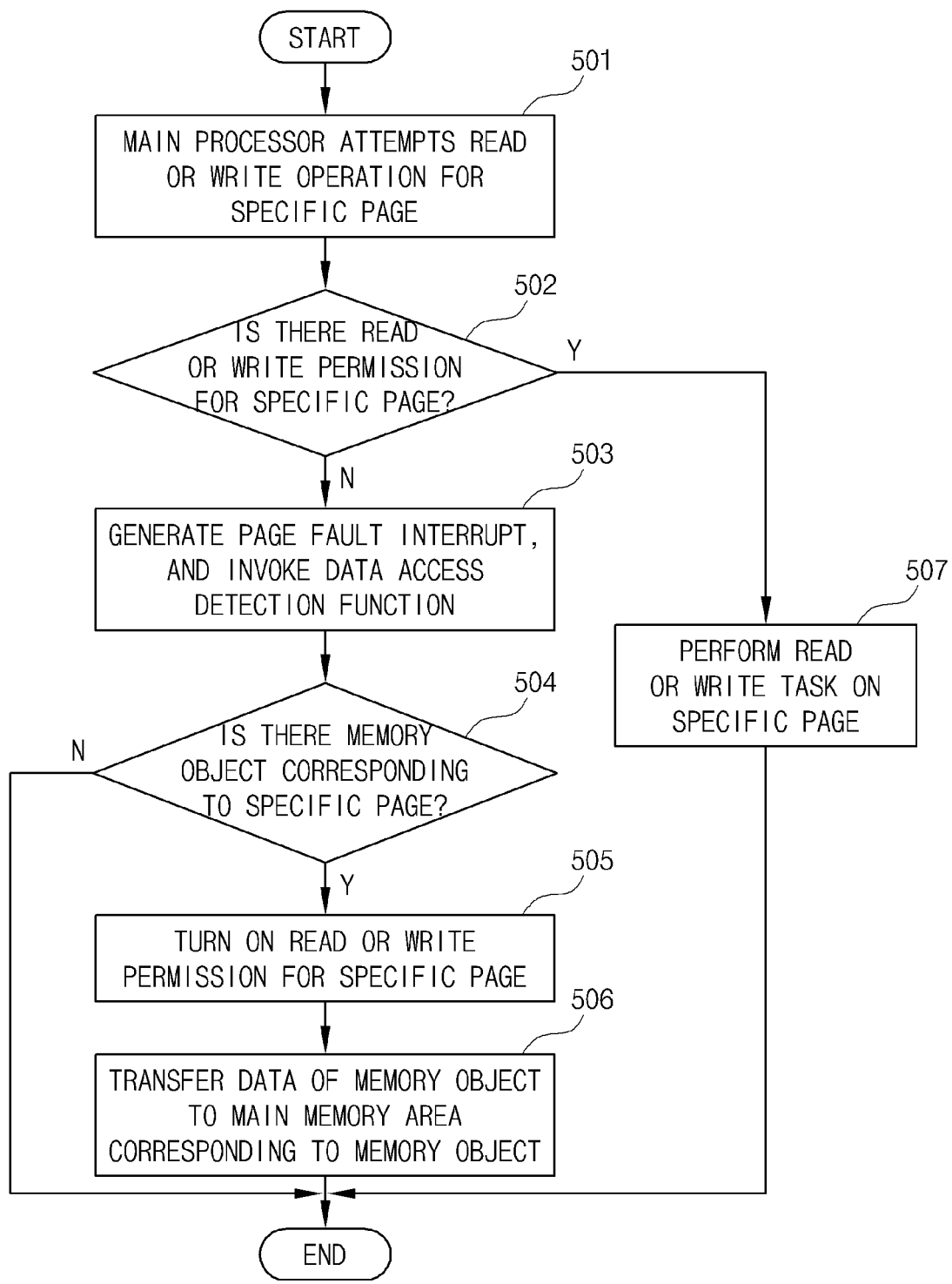
FIGS. 5 and 6 are views illustrating a process of transferring data in the case where a read or write operation for a specific page is attempted but a page fault is generated, in the method of transferring data in a parallel system according to the embodiment of the present invention.

Referring to FIG. 5, a process of performing data transfer in the case where the main processor 11 attempts a read or write operation for a page including a specific area of the main memory 12 but a page fault interrupt is generated.

FIG. 5 is a flowchart illustrating a process of performing data transfer in the case where a main processor attempts a read or write operation for a specific page and the operation is denied due to the absence of a permission according to an embodiment of the present invention. Referring to FIG. 5, the main processor 11 attempts a read or write operation for the specific page at step 501. At step 502, the main processor 11 determines whether there is a read or write permission for the specific page.

If, as a result of the determination, the read or write permission for the specific page has been turned on, the process proceeds to step 507, at which the main processor 11 performs a read or write task on the specific page. In contrast, if the read or write permission for the specific page has been turned off, the process proceeds to step 503, at which the main processor 11 generates a page fault interrupt and invokes a data access detection function. For example, when the main processor 11 attempts a read operation for the specific page but the read permission for the specific page has been turned off, the main processor 11 generates a read fault and invokes a data access detection function. In the same manner, when the main processor 11 attempts a write operation for the specific page but a write permission for the specific page has been turned off, the main processor 11 generates a write fault and invokes a data access detection function.

At step 504, the main processor 11 determines whether a memory object corresponding to the specific page is present via the data access detection function. In this case, the memory object corresponding to the specific page refers to a memory object corresponding to the area of the main memory 12 which includes the specific page or throughout which the specific page is present. The main processor 11 may determine whether a memory object corresponding to the specific page is present by determining whether the area of the main memory 12 which includes the specific page or throughout which the specific page is present is present in the list shown in FIG. 2.

If, as a result of the determination, a memory object corresponding to the specific page is present, the main processor 11 turns on a read or write permission for the specific page via the data access detection function at step 505. In this case, the main processor 11 turns on a read permission if the page fault generated at step 503 is a read fault, and turns on a write permission if the page fault generated at step 503 is a write fault. In this case, when the main processor 11 has turned on a write permission for the specific page, it modifies the modified value of a memory object corresponding to the specific page to "true."

At step 506, the main processor 11 transfers the data of the memory object to the area of the main memory 12 corresponding to the memory object via the data access detection function.

Figure 6:
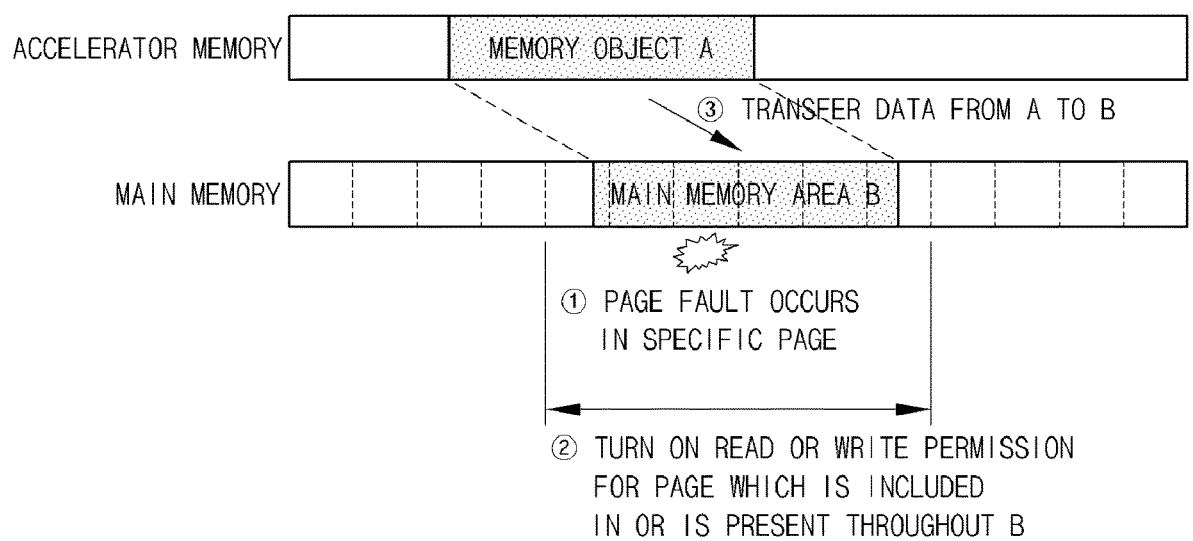

Now, referring to a specific example shown in FIG. 6, a method of transferring data in the case where a read or write operation for a specific page is attempted but is denied.

Referring to FIG. 6, although the main processor 11 attempts a read or write operation for a page which is included in or is present throughout main memory area B, a read or write permission has been turned off, and thus a page fault (a read or write fault) is generated and a data access detection function for the corresponding page is invoked. The data access detection function inspects whether a memory object corresponding to the page is present. Since memory object A corresponding to main memory area B throughout which the page is present is present, the data access detection function determines that a memory object corresponding to the page is present.

The data access detection function turns on read or write permissions for all pages which are included in or present throughout main memory area B, and transfers the data of memory object A to main memory area B. In this case, when the data access detection function has turned on the write permissions for all the pages, the data access detection function modifies the modified value of memory object A to "true."

Meanwhile, in the above-described embodiments, it is assumed that there is not a case where the same page is present throughout two main memory areas B1 and B2 corresponding to different memory objects A1 and A2, respectively. According to an embodiment, in order to ensure the above assumption, it may be possible to forcibly prevent the same page from being shared with another area already allocated to the main memory 12 whenever a new area is allocated to the main memory 12 (for example, when a malloc function is invoked).

Furthermore, according to an embodiment, rather than performing the steps of FIGS. 3 and 4 on all input and output data areas for a specific computation task, it may be possible to perform the steps of FIGS. 3 and 4 on part of input and all output data areas for the specific computation task. For example, in the case of a general x86 CPU and an OS running on the x86 CPU, the function of selectively turning on and off read and write permissions is provided for a heap memory area, whereas the function of selectively turning on and off read and write permissions is not provided for a stack memory area. In this case, the process of FIG. 3 is applied only for the heap memory area of an input data area, and, in the same manner, the process of FIG. 4 may be applied only for the heap memory area of an output data area.

The term "unit" used herein refers to, but is not limited to, a software component or a hardware component, such as a Field Programmable Gate Array (FPGA) or an Application Specific Integrated Circuit (ASIC), which performs specific tasks. A unit may be configured to reside on the addressable storage medium, and may be configured to be executed on one or more processors. Accordingly, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The functionality provided in components and units may be combined into a smaller number of components and units, or may be separated into additional components and units.

Furthermore, components and units may be configured to be executed on one or more CPUs inside a device or security multimedia card.

Furthermore, the method of transferring data in a parallel system according to an embodiment of the present invention may be implemented as a computer program (or a computer program product) in computer-executable instructions. The computer program includes programmable machine instructions which are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the method of transferring data in a parallel system according to the embodiment of the present invention may be implemented in such a way that a computer program, such as that described above, is executed by a compute device. The compute device may include at least part of a processor, memory, a storage device, a high-speed interface accessing the memory and a high-speed expansion port, and a low-speed interface accessing a low-speed bus and a storage device. These components are connected to each other by means of various buses, and may be mounted on a common mother board or by means of another appropriate method.

In this case, the processor may process instructions in a compute device. For example, these instructions may be instructions which are stored in memory or a storage device and are used to display graphic information adapted to provide a graphic user interface (GUI) to an external input/output device, for example, a display connected to a high-speed interface. As another embodiment, a plurality of processors and/or a plurality of buses may be appropriately used along with a plurality of pieces of memory and memory forms. Furthermore, the processor may be implemented as a chip set which includes chips including a plurality of independent analog and or digital processors.

Furthermore, the memory stores information in a compute device. For example, the memory may be composed of a volatile memory unit or a set of volatile memory units. As another example, the memory may be composed of a non-volatile memory unit or a set of nonvolatile memory units. Furthermore, the memory may be, for example, another type of computer-readable medium, such as a magnetic or optical disk.

Furthermore, the storage device may provide a large-sized storage space to a compute device. The storage device may be a computer-readable medium or a configuration including such a medium. For example, the storage device may include devices included in a storage area network (SAN), or may include another component. The storage device may be a floppy disk device, a hard disk device, an optical disk device, a tape device, flash memory, or another semiconductor memory device or device array similar thereto.

According to any one of the above-described solutions, in the performance of a computation task in the parallel system, even when a program including the computation task requests the transfer of data, it is not until an actually required time that the data transfer task is performed. Accordingly, unnecessary data transfer is not performed, and thus the execution time of the program can be reduced.

Furthermore, according to any one of the above-described solutions, as long as a programmer creates a semantically correct program without a need to directly perform separate complex optimization in order to prevent the execution time of a program from increasing due to unnecessary data transfer, optimization used to eliminate unnecessary data communication automatically occurs during the execution of the program, and thus programming is simplified.

Moreover, according to any one of the above-described solutions, in the selection of a parallel programming model for a heterogeneous system, a programmer can select a parallel programming model (OpenMP 4.0, or OpenACCdata) which has a limitation in terms of the specific designation of the time at which data is transferred but is easy to use, rather than selecting a parallel programming model (OpenCL, CUDA, or the like) which is difficult to use but enables the time at which data is transferred to be designated more specifically, and thus programming is simplified.

The effects which can be obtained in the present invention are not limited to the above-described effects, and other effects which have not been described will be clearly understood from the following description by those having ordinary knowledge in the art to which the present invention pertains.

The foregoing description of the present invention is merely illustrative, and it will be understood by those having ordinary knowledge in the art to which the present invention pertains that modifications and variations can be easily made without departing from the technical spirit and essential features of the present invention. Therefore, it should be appreciated that the above-described embodiments are illustrative in all aspects but are not limitative. For example, each component which is described as being in a single form may be practiced in a distributed form. In the same manner, components that are described as being in a distributed form may be practiced in an integrated form.

The scope of the present invention is defined by the attached claims, rather than the detailed description. Furthermore, all modifications and variations derived from the meanings, scope and equivalents of the claims should be construed as falling within the scope of the present invention.

What is claimed is:

1. A method of transferring data in a heterogeneous system including a main device and at least one accelerator, the method comprising:
    turning off a write permission for a first main memory area corresponding to a first accelerator memory area where input data for a computation task is stored, before the computation task is performed;
    performing the computation task by using the at least one accelerator; and
    after the computation task is performed, turning off a read permission for a second main memory area corresponding to a second accelerator memory area where output data for the computation task is stored, in a state in which data of the second accelerator memory area has not been transferred to the second main memory area.

2. The method of claim 1, further comprising, when a main processor included in the main device attempts to write data to the first main memory area, turning on the write permission for the first main memory area, and setting a modified value for the first accelerator memory area to "true."

3. The method of claim 2, wherein setting the modified value to "true" comprises:
    when the main processor attempts to write data to the first main memory area, generating a page fault interrupt, and invoking a data access detection function;
    determining the first accelerator memory area corresponding to the first main memory area;
    turning on the write permission for the first main memory area; and
    setting the modified value for the first accelerator memory area to "true."

4. The method of claim 1, further comprising, when a main processor included in the main device attempts to read data from the second main memory area, turning on the read permission for the second main memory area, and transferring data of the second accelerator memory area to the second main memory area.

5. The method of claim 4, wherein transferring the data to the second main memory area comprises:
    when the main processor attempts to read data from the second main memory area, generating a page fault interrupt, and invoking a data access detection function;
    determining the second accelerator memory area corresponding to the second main memory area;
    turning off the read permission for the second main memory area; and
    transferring data of the second accelerator memory area to the second main memory area.

6. The method of claim 1, wherein turning off the write permission comprises:
    determining whether the first accelerator memory area corresponding to the first main memory area is present in accelerator memory included in the at least one accelerator;
    if the first accelerator memory area is not present, generating the first accelerator memory area;
    transferring data of the first main memory area to the generated first accelerator memory area; and
    turning off the write permission for the first main memory area.

7. The method of claim 1, wherein turning off the write permission comprises:
    determining whether the first accelerator memory area corresponding to the first main memory area is present in accelerator memory included in the at least one accelerator;
    if the first accelerator memory area is present, determining a modified value assigned to the first accelerator memory area;
    if the modified value is "true," transferring data of the first main memory area to the first accelerator memory;
    setting the modified value to "false"; and
    turning off the write permission for the first main memory area.

8. A non-transitory computer-readable storage medium having stored thereon a computer program which, when executed by a heterogeneous system, causes the heterogeneous system to execute the method of claim 1.

9. A computer program which is executed by a heterogeneous system and is stored in a non-transitory computer-readable storage medium in order to perform the method of claim 1.

10. A heterogeneous system comprising:
    a main device including a main processor and main memory; and
    at least one accelerator including an accelerator processor and accelerator memory;
    wherein the main processor turns off a write permission for a first main memory area corresponding to a first accelerator memory area where input data for a computation task is stored before the computation task is performed, performs control so that the at least one accelerator performs the computation task, and after the computation task is performed, turns off a read permission for a second main memory area corresponding to a second accelerator memory area where output data for the computation task is stored, in a state in which data of the second accelerator memory area has not been transferred to the second main memory area.

11. The heterogeneous system of claim 10, wherein when the main processor attempts to write data to the first main memory area, the main processor turns on the write permission for the first main memory area and sets a modified value for the first accelerator memory area to "true."

12. The heterogeneous system of claim 11, wherein when the main processor attempts to write data to the first main memory area, the main processor generates a page fault interrupt, invokes a data access detection function, determines the first accelerator memory area corresponding to the first main memory area, turns on the write permission for the first main memory area, and sets the modified value for the first accelerator memory area to "true."

13. The heterogeneous system of claim 10, wherein when the main processor attempts to read data from the second main memory area, the main processor turns on the read permission for the second main memory area and transfers data of the second accelerator memory area to the second main memory area.

14. The heterogeneous system of claim 13, wherein when the main processor attempts to read data from the second main memory area, the main processor generates a page fault interrupt, invokes a data access detection function, determines the second accelerator memory area corresponding to the second main memory area, turns on the read permission for the second main memory area, and transfers data of the second accelerator memory area to the second main memory area.

15. The heterogeneous system of claim 10, wherein the main processor determines whether the first accelerator memory area corresponding to the first main memory area is present in accelerator memory included in the at least one accelerator, and, if the first accelerator memory area is not present, generates the first accelerator memory area, transfers data of the first main memory area to the generated first accelerator memory area, and turns off the write permission for the first main memory area.

16. The heterogeneous system of claim 10, wherein the main processor determines whether the first accelerator memory area corresponding to the first main memory area is present in accelerator memory included in the at least one accelerator, and, if the first accelerator memory area is present, determines a modified value assigned to the first accelerator memory area, transfers data of the first main memory area to the first accelerator memory if the modified value is "true," sets the modified value to "true," and turns off the write permission for the first main memory area.

* * * * *